(12) United States Patent
Hanrahan

(10) Patent No.: US 6,299,781 B1
(45) Date of Patent: Oct. 9, 2001

(54) REMOVAL OF HYDROCARBON COMPONENTS FROM AN AQUEOUS WASTE STREAM

(75) Inventor: Michael Hanrahan, Woodinville, WA (US)

(73) Assignee: Advanced Water Systems, Woodinville, WA (US)

( * ) Notice: Subject to any disclaimer, the term of this patent is extended or adjusted under 35 U.S.C. 154(b) by 0 days.

(21) Appl. No.: 09/455,617

(22) Filed: Dec. 7, 1999

(51) Int. Cl.$^7$ ............................................... C02F 1/461
(52) U.S. Cl. ..................... 210/748; 210/750; 210/758; 210/767; 210/188; 210/198.1; 210/908; 205/338; 205/633; 95/172; 96/193
(58) Field of Search ..................... 210/748, 750, 210/758, 767, 188, 198.1, 908; 205/338, 633; 95/172; 96/193

(56) References Cited

U.S. PATENT DOCUMENTS

| | | |
|---|---|---|
| 4,979,886 | 12/1990 | Rippberger . |
| 5,104,525 * | 4/1992 | Roderick ........................... 210/188 |
| 5,424,045 | 6/1995 | Orman et al. . |
| 5,460,734 * | 10/1995 | Birbara et al. ..................... 210/758 |
| 5,767,060 | 6/1998 | Hanrahan . |
| 5,863,510 | 1/1999 | Pozniak et al. . |

* cited by examiner

Primary Examiner—David A. Simmons
Assistant Examiner—Betsey Morrison Hoey
(74) Attorney, Agent, or Firm—Thomas M. Freiburge

(57) ABSTRACT

Water containing difficult-to-remove volatile hydrocarbon contaminants which may include MTBE, TBA and/or BTEX is treated under pressure by electrolysis and oxidative reduction in a contact area, then is depressurized and subjected to high shear in a multi-stage turbine column to precipitate and/or outgas nearly all of the contaminants. In the turbine column, redirect diverters are included below each turbine in order to redirect the water/gas stream to center and to further atomize the stream at each stage. Liquid discharge is received in a bottom reservoir of the casing or tank. Vacuum is applied to the casing, at about 30 inches of water, to constantly remove air and gases from the casing, and causing air to be drawn at high flow rate down through the turbine column, helping volatilize the hydrocarbon components. A submersed pump in the liquid reservoir removes the treated water.

20 Claims, 5 Drawing Sheets

# REMOVAL OF HYDROCARBON COMPONENTS FROM AN AQUEOUS WASTE STREAM

BACKGROUND OF THE INVENTION

This invention concerns removal of hydrocarbon components from a contaminated water stream. More specifically the invention relates to a system which uses oxidation/reduction, changes of vapor pressure and atomization of the liquid stream to separate and outgas difficult-to-remove components that typically are liquids at standard temperature and pressure.

Abatement of hydrocarbon contamination in soils and ground water is increasingly mandated in the United States, Canada and other countries. In California and several other states of the U.S., the addition to gasoline of MTBE has been required, supposedly to increase the efficiency of gasoline combustion in internal combustion engines, so as to release less pollutant to the air. However, this has turned out to be a serious mistake of monumental proportion, since the toxic MTBE has rapidly found its way into soils, ground water, lakes and streams. Moreover, once in soils, the MTBE produces a toxic organic byproduct, TBA (tributyl acryl). TBA in water such as ground water is extremely difficult to remove, and no efficient method or system has been found prior to the present invention.

U.S. Pat. No. 5,767,060, owned by the assignee of the present invention, discloses a multi-component medium through which contaminated water can be filtered to remove many noxious hydrocarbon components. The system is efficient at removing nearly all hydrocarbon components, including MTBE, but not TBA.

U.S. Pat. Nos. 4,979,886, 5,424,045 and 5,863,510 are concerned with remediation of contaminated water and soil which may contain combustible hydrocarbons. The first patent discloses separation of hydrocarbons from water by spray aeration of a heated water stream under vacuum. The first and second patents both describe combustion of the recovered hydrocarbon vapors in internal combustion engines.

It is an objective of this invention to remove TBA, MTBE and other hydrocarbon contaminants including BTEX from a contaminated water stream using an efficient process embodied in a compact and portable apparatus, to extract these contaminants down to a level below 0.2 parts per billion as is now required in some jurisdictions.

SUMMARY OF THE INVENTION

In the process and system of the invention, contaminated waste water is introduced into a preferably self-standing unit via a pressure pump mounted at an end of the unit housing and delivering preferably about 40 to 60 psi. The pressurized water passes through an electrolytic cell, which preferably operates on adjustable timed polarity reversal in order to avoid contaminant buildup and plating of electrodes.

Pressure is maintained as water and hydrolyzed gases pass into an oxygen contact tank, preferably sized for two minute retention time for the moving fluid stream. An eductor port may be provided in this tank for infusion of treatment chemicals such as peroxide or potassium permanganate for higher oxidative reduction.

The flow of fluid then continues under pressure to a plurality of pulsed spray heads. These nozzles break up the water column and inject the large droplets into a high shear turbine equipped with redirecting diverter baffles that return the liquid inwardly after each turbine stage, further atomizing the stream.

When the water is released through the spray nozzles into the turbine column, it not only experiences instant depressurization but also is then placed under vacuum. This vacuum, which may be about 30 inches of water, is induced by a vacuum pump on the casing or housing, pulling a vacuum through the interior of the entire casing, whose only inlet is at the top of the turbine column, adjacent to the spray nozzles. Thus, a rapid stream of air is drawn through the turbine column along with the atomized liquid. The system therefore combines instantaneous depressurization (which greatly increases vapor pressure for the contaminants) with very high surface area on the liquid, high shear caused by the turbines and baffles, and a rapid flow of air down through the column and commingling with the atomized liquids. The result is a high rate of outgassing of the volatile components which were contained in the water, releasing nearly all volatiles to the housing space above a liquid reservoir which remains at the bottom, fed by the turbine column discharge.

Water is discharged laterally at the bottom of the turbine sleeve into the liquid reservoir, which is then pumped via a regulated submersible pump out of the casing for discharge as decontaminated water or for further treatment. The liquid in the reservoir is constantly agitated by the lowermost turbine blade, which is under water.

An important feature of a preferred embodiment is the shape and location of the turbine column discharge. Discharge preferably straddles the liquid reservoir level, about half of the opening above the level and half the opening below. A stream of mixed liquid and gases (which may be about 80:1 gas to water) is ejected at high velocity toward a wall of the casing, or more preferably against a stainless steel splash plate. Evaporation of water occurs at the splash plate, lowering its temperature, under preferred parameters by about 10° F. This evaporation is from the primarily gaseous stream in the top half of the discharge, but containing enough water droplets to cause the evaporative cooling effect. The plate is cooled sufficiently that it re-condenses much of the water vapor contacting the plate, thus reducing the moisture content of the air and gases within the casing, to be discharged by the vacuum pump. This is important in the event the gaseous stream exiting the system needs further treatment. In addition, the half-submerged exit nozzle tends to retain most of the liquid from the flowing stream down in the liquid at the base of the turbine column, thus remaining within the liquid as it is discharged into the reservoir.

The liquid in the reservoir is retained within a prescribed range of water level by cycling of the submersible pump, which discharges water from the system. The anaeroid switch operating the pump is connected by a tube to atmospheric pressure outside the casing, so as to compare the liquid pressure head existing above a sensor on the pump with atmospheric pressure. The liquid level can be regulated from outside the casing, in one specific embodiment, by placing the end of the atmospheric communication tube adjacent to the vacuum pump on the top of the casing. The vacuum pump preferably is carbureted to adjust the strength of vacuum pulled, by mounting the pump such that it can be raised or lowered to let more or less air enter the vacuum pump directly, to mix with the air and gas pulled through the casing. Thus, atmospheric air is constantly being pulled from around the base of the vacuum pump, to be mixed with the discharged air/gases recovered in the system. The atmospheric communication line from the aneroid pump can be moved closer to the base of the vacuum pump to adjust the sensed "atmospheric" pressure lower, thereby increasing the differential from the sensed water head in the reservoir and causing the reservoir level to be lowered, or vice versa. This can be fine tuned to establish the reservoir at the desired level. A small hole can be provided in the exterior of the casing, to allow observation of the liquid level, after which the hole is sealed by a plug.

It is thus a primary object of this invention to recover difficult volatile hydrocarbons from a wastewater stream, in an efficient and cost-effective manner, and to do so with a transportable and compact unit which combines electrolysis, oxidation/reduction, high shear, sudden change in vapor pressure, very high liquid surface area and rapid air flow through the atomized droplets. These and other objects, advantages and features of the invention will be apparent from the following description of a preferred embodiment, considered along with the accompanying drawings.

DESCRIPTION OF PREFERRED EMBODIMENTS

Figure 1:
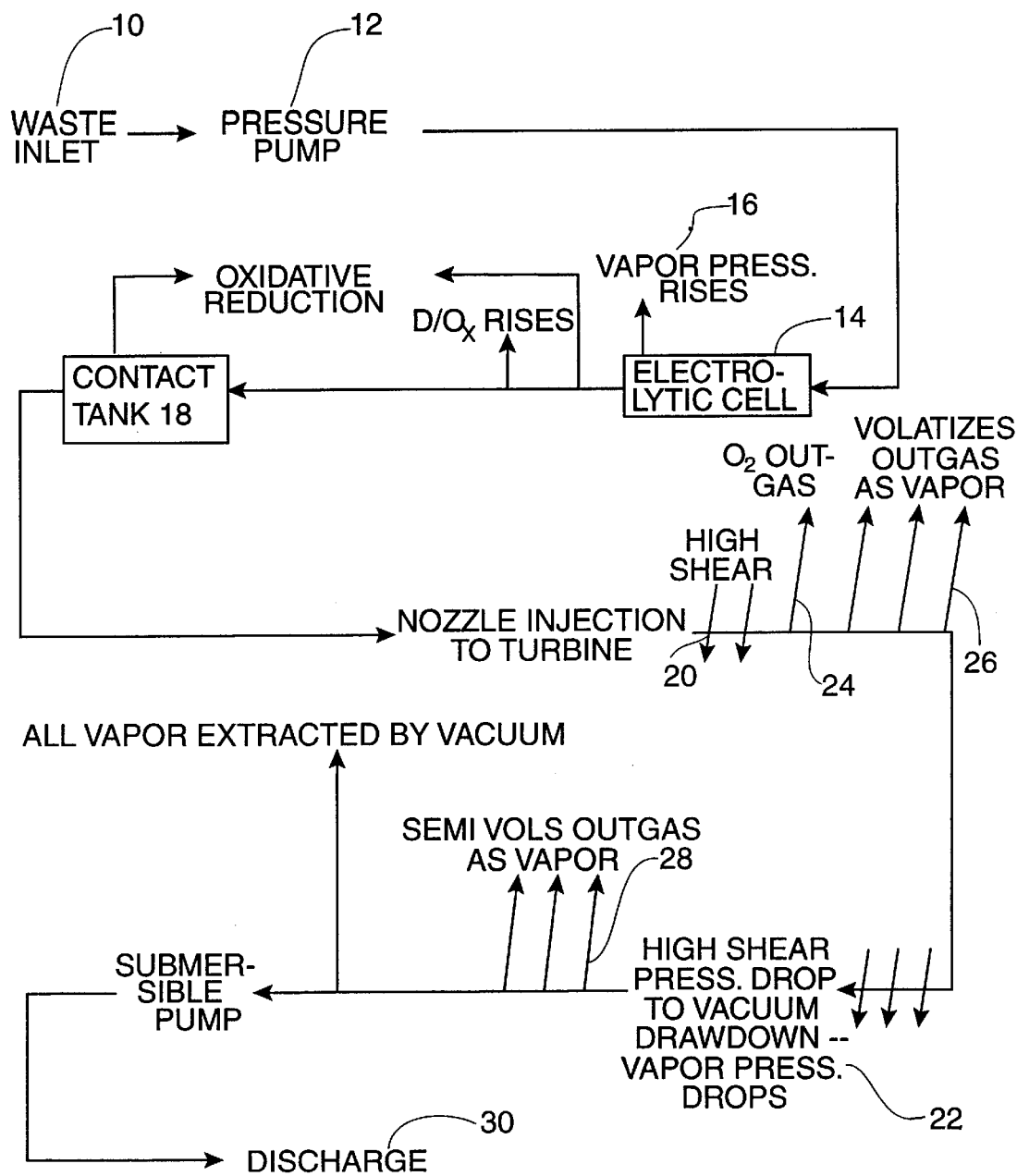
FIG. 1 is a schematic diagram in the form of a flow chart indicating the process of the invention.
Figure 2:
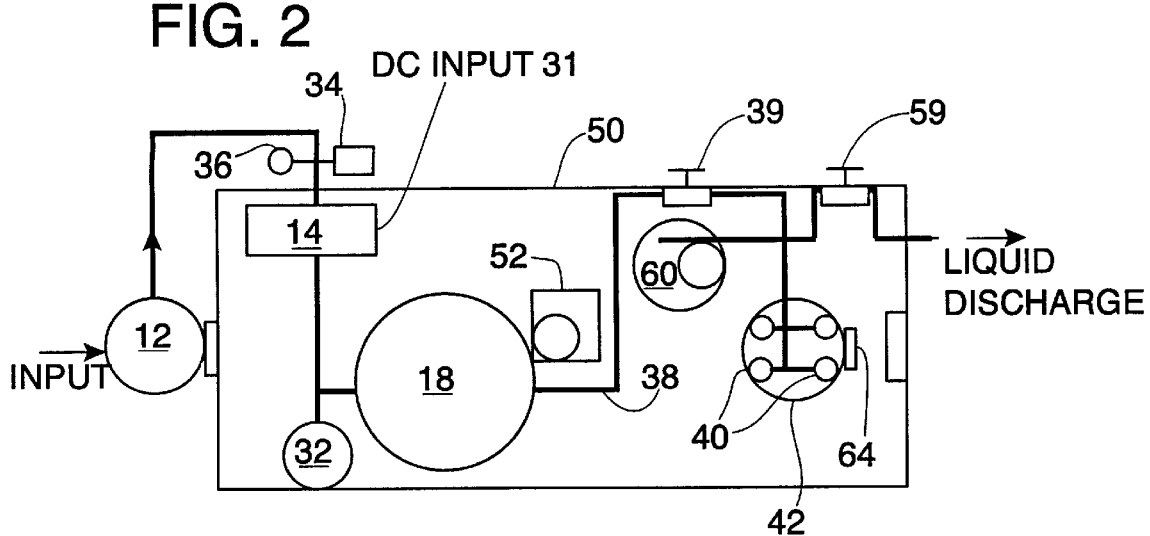
FIG. 2 is a plan view showing a preferred embodiment of a water treatment unit according to the invention.

FIG. 1 shows schematically the general flow of the process of the invention. Wastewater is shown at 10 flowing under pressure via a pump 12 through an electrolytic unit 14. The liquid exiting the electrolytic unit is rich and oversaturated in dissolved oxygen, with the pressure on the liquid (e.g. 40 to 60 psi) establishing a high vapor pressure for retention of gases, as indicated at 16. This liquid/gas mixture goes into a contact tank 18, with a preferred dwell time of at least two minutes, promoting oxidative reduction of contaminants in the water. From there, the flow enters a high shear turbine 20 wherein pressure is released and vacuum is introduced, e.g. 30 inches of water below atmospheric pressure. Vapor pressure on the liquid immediately drops, as indicated at 22. This causes outgassing of oxygen and volatiles, as indicated at 24 and 26, as well as outgassing of semi-volatiles which are ordinarily soluble at room temperature, as indicated at 28. Discharge of the treated water is indicated at 30.

FIGS. 2–7 show the system and its components in better detail.

The contaminated water enters the first stage of the system, which is an electrolytic unit 14, under pressure from the pump 12, preferably about 40 to 60 psi or somewhat higher. The electrolytic unit 14 may be of the type described in U.S. Pat. No. 4,917,782. A DC input 31 feeds the electrolytic unit, and this preferably is an infinitely variable, zero to 140 volt D.C. supply, operating typically at 20–40 amps across the load, allowing for variations in water conductivity. The electrolytic unit 14 may operate at about 0.083 amps/sq. in. current density on the electrodes. After being electrolyzed in the electrolysis unit 14, the mix of liquid and gases remains at an elevated pressure, and goes through or by an accumulator tank 32 which contains some air separated by a diaphragm, to help maintain even pressure. It is preferable that the pump 12 not cycle very frequently, and the accumulator tank helps damp out pressure surges. A pressure sensor 34 on the discharge line of the pressure pump 12 controls cycling of the pump. The accumulator 32 acts as a pressure cushion. The system may include a pressure gauge 36 for visible indication of pressure.

After the accumulator, the water is still at a prescribed pressure and elevated dissolved oxygen, preferably about 300% to 400% of standard oxygen saturation due to being under pressure. Then it moves into the contact tank 18, which preferably is sized to provide a full two minutes of oxygen contact time within the tank. Oxidation and reduction occur. Vapor pressure of the environment on the hydrocarbon components is very high here.

In the next stage of the system, the water/gas mix flows from the contact tank 18 through a pipe 38 and a flow regulator valve 39 to a series of nozzles 40 at a top end of a turbine sleeve or column 42 where the mix is suddenly depressurized, and sprayed in an interrupted small droplet mode into the turbine 44 itself, which is a high shear turbine with a series of turbine blades 44a, 44b, etc., designed to augment the flow velocity through the sleeve. The turbine has a shaft 46 driven by a motor M. At the bottom of the multi-stage turbine column the liquid water and some mist are delivered to the bottom reservoir 48 of a tank or casing 50 within which most of the system components are contained. Air is delivered at high flow rate to the turbine 44 by a vacuum pump 52, which lowers pressure in the entire casing 50 (e.g. 30 in. $H_2O$ below atmospheric), and the turbine top is the only part of the casing open to the atmosphere. Since a vacuum is pulled on the entire casing, the entering air has to flow through the turbine and out the discharge of the vacuum pump 52. The pump 52 may be one manufactured by Ametek, a three-stage tangential discharge vacuum pump rated at over 100 inches water totally sealed. The vacuum pump itself can move about 120 CFM through the sleeve 42 and the casing due to the resistance encountered; with the flow augmentation of the turbine, this increases to about 160 CFM.

The system thus combines high shear water with a high volume of air, and consequently develops high mass transfer within the turbine column 42. Further, the water actually goes from about 40 to 60 psi or higher down to negative pressure, down to approximately 30 inches of water below atmospheric in one preferred implementation. The instantaneous drop in pressure creates an outgassing situation, in that the water is taken from a very low vapor pressure relative to the surrounding environment (in a pressurized system) to a very high vapor pressure relative to the final low pressure surrounding environment, accented by pulling a vacuum in order to make the differential even greater. Outgassing of volatiles occurs, including hydrocarbons that normally are liquid or soluble at standard temperature and pressure.

Figure 6:
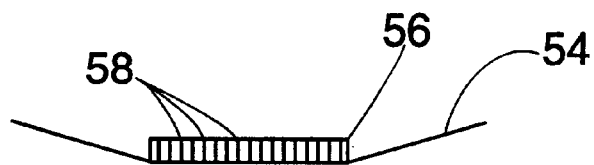
FIG. 6 is a detailed view showing components of a shear column of the system.

The turbine column 44 has important preferred features. In one implementation it includes five turbine blades 44a–44e, the blades being about 7½ inches in diameter, within a sleeve of about 8 inches inside diameter. The blades may be driven at about 1600 to 3500 RPM. A motor used in a preferred embodiment can be set to run at 1725 RPM or 3450 RPM. Diversion baffles 54 are included between turbine blades. The effect of the turbine blades is centrifugal, tending to throw all water out to the outside of the sleeve or column 42. Downstream of each turbine blade the water is forced back to the middle of the column by the diversion baffles. These preferably include lips or flanges 56 on the inboard side as shown in FIG. 6, with sawtooth notches 58 to stir up the liquid, to refragment the gas bubbles and to agitate. The air is drawn through the sawtooth edges along with the liquid into the succeeding turbine blade which shears it again and this continues through four or five stages.

At the bottom of the main tank 50 is the reservoir 48 of essentially de-gassed water. At this point any volatile or semivolatile chemicals which are normally liquids have been volatilized and extracted by the vacuum stream. These will appear in the air/gas discharge of the vacuum pump 52. There are also solids of other innocuous substances such as iron that become oxides of iron, as precipitates, and these are held in suspension until they reach the reservoir 48. The reservoir liquid is stirred by the last stage turbine blade 44e, which is submerged. This keeps a buildup of sludge from impairing the flow through the tank.

Figure 3:
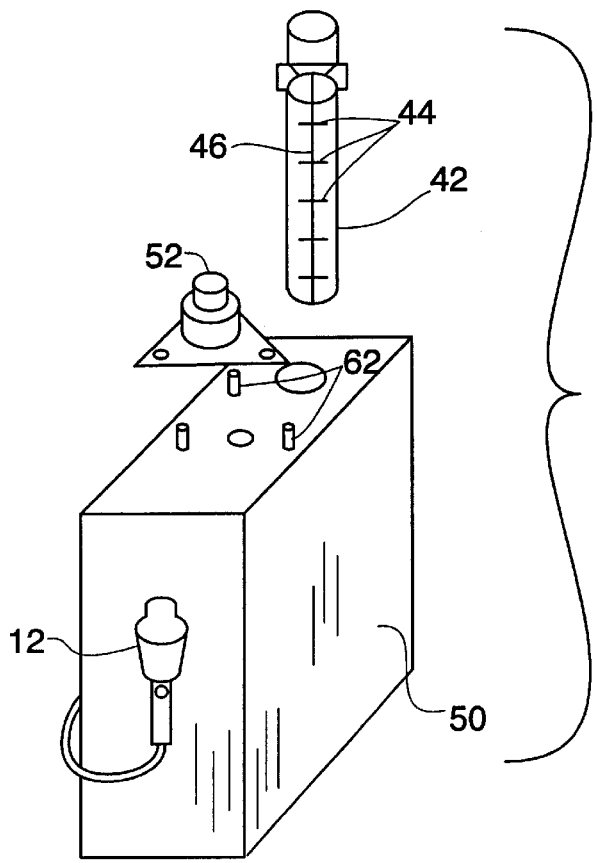
FIG. 3 is a perspective view, partially exploded, showing the unit.
Figure 4:
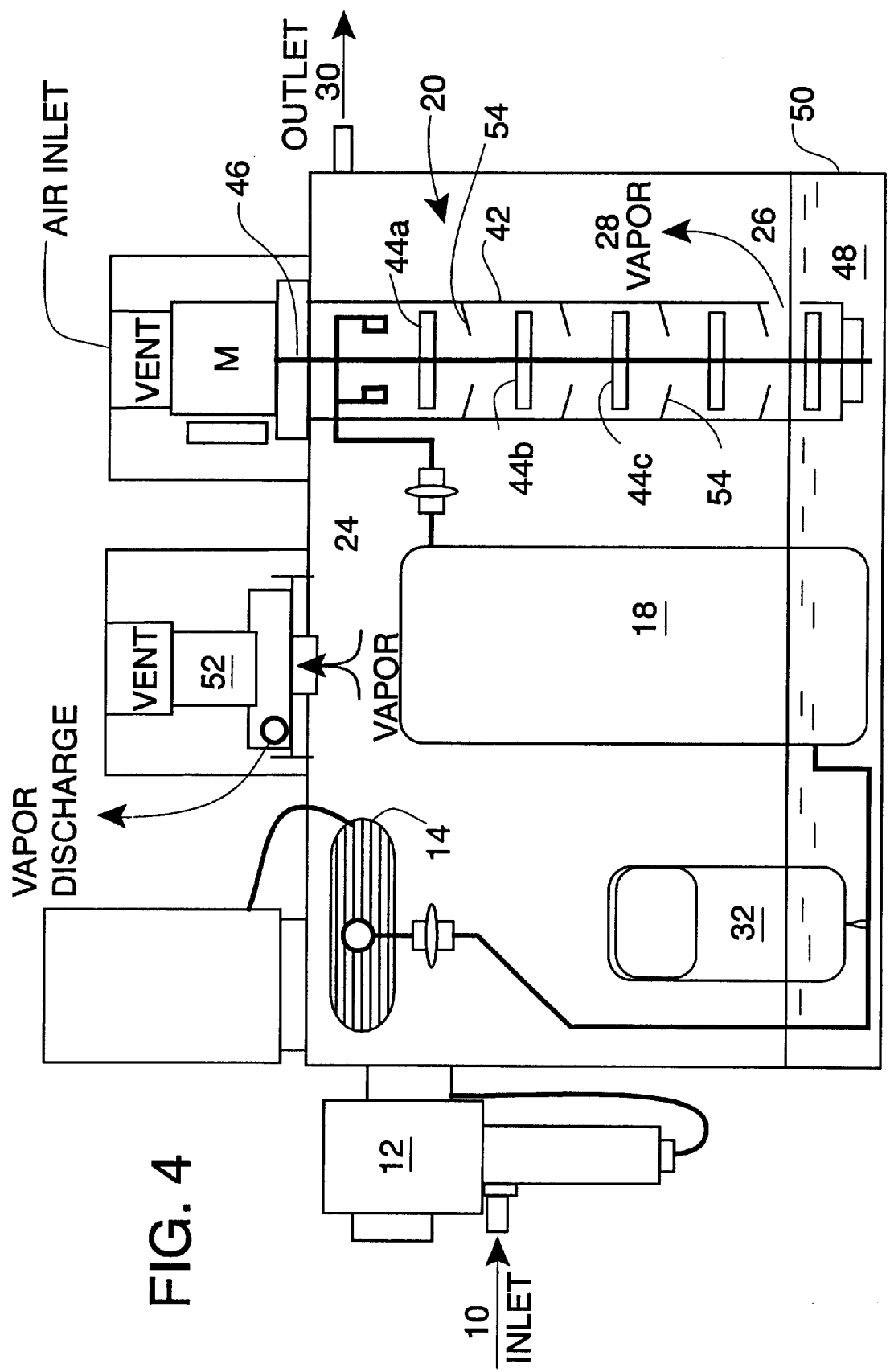
FIG. 4 is a side view of the unit, partially in cross section.
Figure 5:
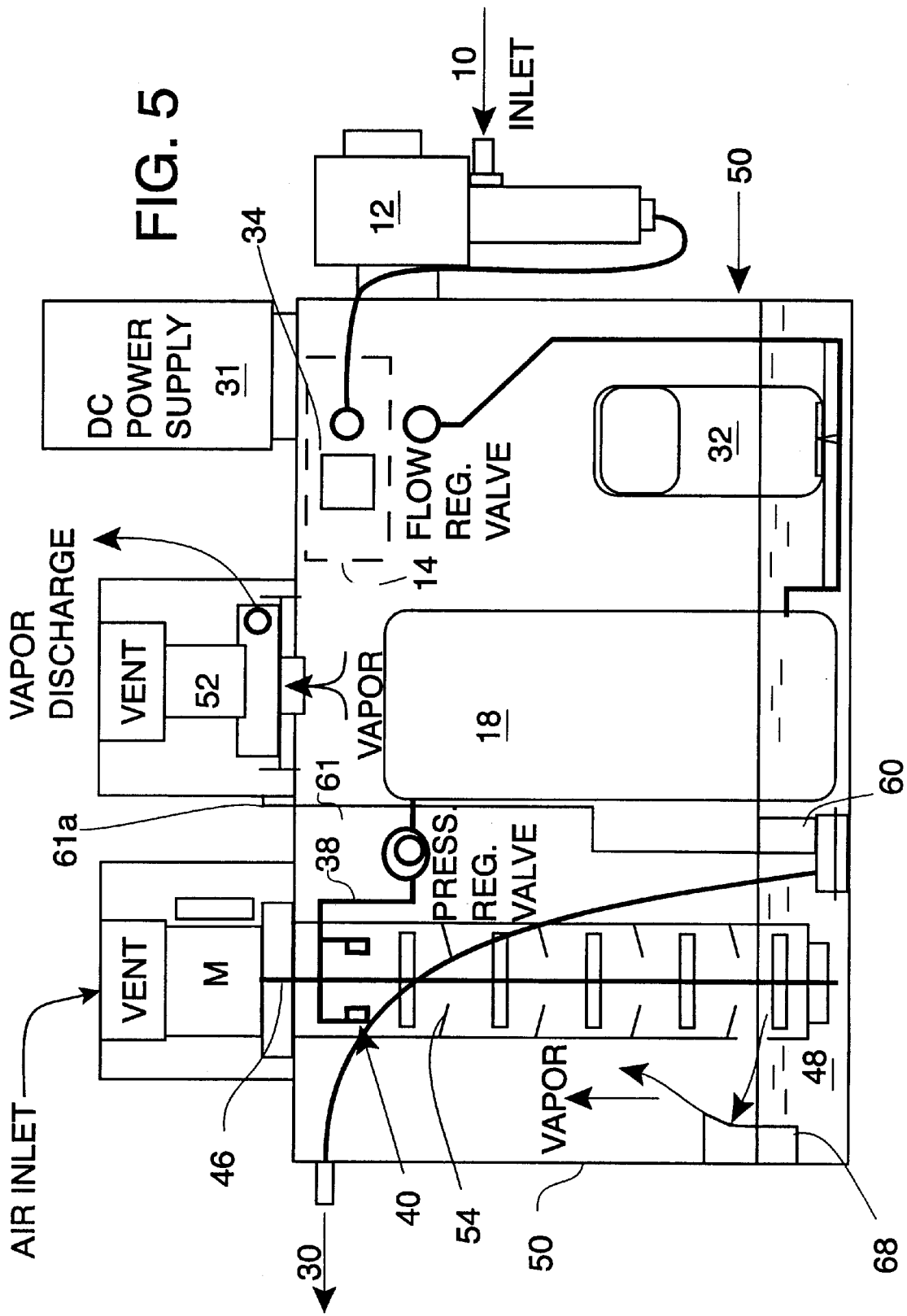
FIG. 5 is a partially schematic elevation view showing the components of the treatment unit and indicating flow.

To discharge the reservoir liquid and precipitates, pumping is required because the entire casing 50 is under vacuum. For this purpose a submerged discharge pump 60 is located on the reservoir bottom for pumping out the liquid, and the pump strength has to be balanced against the vacuum placed on the reservoir because it is preferred to use a type of pump which is loose, not a high tolerance pump. As noted above, the vacuum pump 52 is set up with the ability to adjust it, such that the pump sucks in some atmospheric air along with the draw from the tank 50. Mounting screws or bolts 62 can be adjusted to move the vacuum pump to higher or lower positions over the casing, as best seen in FIG. 3. Thus, the vacuum pump 52 can be adjusted so that the vacuum in the casing is essentially balanced with the liquid discharge pump 60, so the discharge pump 60 can eject liquid at a specified rate over and above the effect of the vacuum. The pumps are balanced so that the liquid discharge rate is essentially equal to the liquid input rate to the system so that the level of liquid in the reservoir can remain as specified.

The submersible pump 60 has a small pressure sensing line 61 leading out to atmosphere, and the pump cycles on and off based on the difference in pressure from the standing head of water in the reservoir versus atmospheric pressure. A valve 59 can be included to control discharge. The pump is set so as not to cycle on and off too frequently; when the liquid in the reservoir is a specified distance above the pump, the pump cycles on, and the total variation allowed by the pump is preferably about a half inch in the liquid reservoir. This narrow range is important for reasons described below.

The liquid pump 60 preferably includes an anaeroid switch which compares the water pressure head in the reservoir to atmospheric pressure, thus providing inputs to cycle the pump on and off. One preferred variation is that the small atmospheresensing line 61 can be placed so that its end 61a is close to the vacuum intake for the vacuum pump 52, that pump preferably being mounted on top of the casing 50. The proximity of the sensing line end 61a can then be adjusted near or farther from the atmospheric intake of the vacuum pump 52, so as to adjust the "atmospheric" pressure by which the anaeroid switch makes its comparison. In this way, the system can be fine-tuned externally, to adjust the level of the liquid in the reservoir from outside the tank. Movement of the line closer to the vacuum pump intake will increase differential and cause the reservoir level to lower, and vice versa. A hole with a removal plug (not shown) can be provided somewhere on the casing wall for visual observation of the liquid level.

As an alternative, a float switch could be used within the tank, to keep the reservoir level within prescribed limits.

As noted above, there is an important reason for keeping the level of liquid in reservoir 48 constant. The turbine sleeve has a discharge opening 64 through which the liquid and gases emerge at relatively high velocity. See FIG. 7. The liquid level in the reservoir 48 preferably is placed at about halfway up the is discharge opening 64, which may be about a four inch tall oval opening, two inches wide by four inches tall. Thus, essentially a two inch by two inch port is provided above the water level and a two inch by two inch port below the water level.

The water and vapors are ejected with considerable force, preferably against a wall 66 of the casing or, more preferably, against a stainless steel plate 68 which is mostly isolated from the casing wall 66 to avoid heat loading (such as when the system is exposed to solar radiation). The plate 68 is preferably only about two to four inches away from the ejection port 64. Natural evaporative cooling occurs where ejected liquid hits the plate and undergoes some evaporation, and this may lower the temperature of the plate by about 10° F. If the ejection of the liquid and vapors were completely above the reservoir of liquid level, this would cause excessive vaporization, so that most of the vaporized liquid would not be condensed on the wall; but with the liquid level about halfway up the ejector duct 64, the cooled plate 64 or wall will condense substantially all the vaporized water, and that lends itself to a drier discharge. A wet discharge is objectionable in the event the gaseous discharge is subjected to another stage of treatment. It is best to produce as dry a discharge as possible.

The level of the exit duct 64 from the turbine column relative to the reservoir water is a very important feature of the invention, because redissolving of the volatilized hydrocarbons back into the water must be avoided to the greatest extent possible. By maintaining the reservoir level at about half the height of the duct 64, the resistance to flow is far less in the upper half of the discharge duct, so that the vapor tends to come out through the upper half of the duct and not to be injected into the water, whereas the stripped liquid tends to go straight into the reservoir liquid.

The fluid discharged from the turbine sleeve or column 42 is nearly all air, and according to preferred parameters may be approximately 80:1 air and other gases as compared to water. This is because the vacuum pump 52 is rated at about 350 CFM, and it is carbureted by the above-described system of adjustment to partially draw in atmospheric air and resistance is encountered. With an average setting of this carburetion, throughput of air through the sleeve 42 and casing 50 is about 160 CFM as discussed above. This compares to preferred throughput of about 15 to 16 gallons of water per minute in one implementation of the invention, which is about two cubic feet of water per minute. Thus, the ratio of air to water is about 80:1 or greater.

Figure 7:
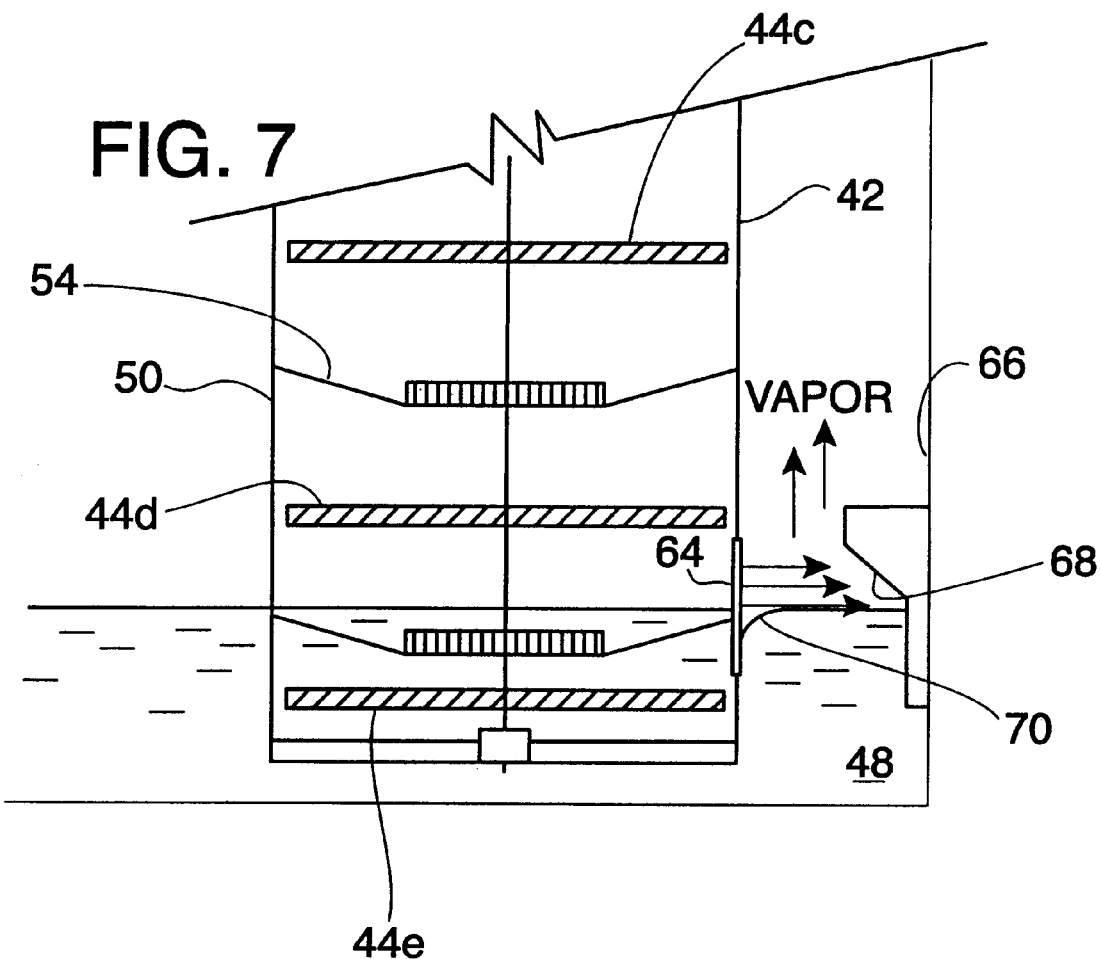
FIG. 7 is a detailed view showing liquid and gases exiting the shear column into a liquid reservoir.

FIG. 7 shows schematically, in cross section, an effect of the rapidly moving air/liquid mix exiting the turbine column duct 64. The high velocity discharge, nearly all air, tends to force the liquid reservoir layer back as shown at 70, at the duct exit. This creates a curved boundary at 70, similar to an airfoil. Such a curved boundary is believed to create a slight additional negative pressure at the boundary layer, which will tend to keep the volatilized gases from going back into solution with the water. In any event, the rushing exit air clearly forms a boundary layer between the air and water surface, which will greatly lower any possibility of reintroducing volatilized vapors into the water.

The parameters noted above can of course be changed, and units of much larger size and throughput can be produced. The important principles are outlined above, including pressurization, electrolysis, supersaturation with oxygen, contact time between the oxygen and the liquids, sudden depressurization, preferably a high shear step combined with negative pressure, and a high volume of air commingled with the atomized liquid during this stage.

The described process and system are far more effective than known air strippers, which would not function efficiently to remove some of the hydrocarbons with which this invention is concerned. This is true in part because the present system operates under vacuum at low temperature, typically within a few degrees of groundwater temperature which may be about 54° or 56°. An air stripper, on the other hand, works under pressure and at high temperature, often 110° F. to 130° F. An air stripper used to treat water will precipitate calcium carbonates and bicarbonates and silica as well as iron due to oxidation, and these substances clog up the system and make it difficult to maintain.

Space efficiency is an important result of the invention. The casing 50 in an embodiment having the preferred parameters discussed above may be about 40 inches long, 18 inches wide and 36 inches tall. It is easily transported to a remediation site. In comparison, an air stripper designed to handle this flow volume of liquid, preferably about 16 gallons per minute, would require about an eight foot square footprint.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method for removing hydrocarbon components from an aqueous waste stream, comprising:
   treating an incoming aqueous waste stream at above-atmospheric pressure with electrolysis, and thereby super-saturating the water of the aqueous stream with oxygen,
   providing a preselected duration of contact time for the water with the dissolved oxygen under pressure, thus promoting oxidation and reduction of contaminants,
   sharply reducing pressure on the aqueous stream by spraying the stream through nozzles to atomize the liquid, and subjecting the depressurized stream to subatmospheric pressure, and
   collecting liquids from the stream in a reservoir and separately withdrawing gases from the stream, including oxygen and outgassed hydrocarbon components.

2. The method of claim 1, including directing the spray from the nozzles into a sleeve where the atomized spray is commingled with a flow of air constantly drawn through the sleeve by a vacuum pump, creating said subatmospheric pressure.

3. The method of claim 2, wherein the sleeve includes a plurality of turbine blades on a shaft driven rotationally by a motor, and wherein the turbines create shear, augment airflow and continue the atomization of the stream, the shear and atomization combined with the sudden depressurization and subatmospheric pressure promoting outgassing of volatile and semivolatile hydrocarbons and other constituents.

4. The method of claim 3, wherein the sleeve includes diversion baffles between turbines, positioned to deflect liquids downstream of a turbine blade inwardly toward the shaft prior to encountering the next turbine blade in the sleeve.

5. The method of claim 2, wherein the liquid and gases are discharged at a high velocity from the sleeve through a discharge outlet, generally transversely to the length of the sleeve, against a metal plate which is cooled by evaporation of liquid discharged and which recondenses most water from the stream, to be collected in the reservoir.

6. The method of claim 5, wherein the sleeve is positioned within a housing on which the vacuum pump is mounted, the sleeve being open to atmosphere at its upper end, and wherein the discharge outlet is positioned partially above and partially below the level of liquid in the reservoir, the reservoir liquid also being within the bottom of the sleeve, such that the gas/water stream exiting the sleeve tends to separate such that water goes into the reservoir liquid and gases are discharged into the housing above the reservoir, to be withdrawn by the vacuum pump.

7. The method of claim 1, wherein the step of subjecting the depressurized stream to subatmospheric pressure is accomplished by a vacuum pump, and the method including discharging liquid from the reservoir using a pump which is balanced with the vacuum pump so as to allow discharge at a rate balanced with the input of the aqueous stream so that a substantially constant level of liquid is retained in the reservoir.

8. The method of claim 1, wherein the subatmospheric pressure is about 30 inches of water below atmospheric.

9. The method of claim 1, wherein the above-atmospheric pressure to which the aqueous waste stream is subjected comprises about 40 to 60 psi gauge.

10. The method of claim 9, wherein the water downstream of the electrolysis step is supersaturated at about 300% to 400% oxygen beyond normal saturation at atmospheric pressure.

11. The method of claim 10, wherein the preselected duration of contact time comprises at least about two minutes.

12. The method of claim 1, wherein the preselected duration of contact time comprises at least about two minutes.

13. The method of claim 1, including directing the spray from the nozzles into a sleeve wherein the atomized spray is commingled with a flow of air constantly drawn through the sleeve by a vacuum pump, creating said subatmospheric pressure, the sleeve being contained within a casing on which the vacuum pump is mounted, and the sleeve being open to atmosphere at its upper end and the casing being otherwise substantially closed, so that the vacuum pump is effective to draw the air from atmosphere down through the sleeve and into the casing, to be ejected by the vacuum pump.

14. The method of claim 13, including pumping collected liquid from the reservoir out to the exterior of the casing, and carbureting the vacuum pump by adjustment of the position of a pump so as to take in more or less atmospheric air along with the air and gases from the casing, to balance the rate of pumping the collected liquid against the vacuum in the housing so as to maintain a substantially constant liquid level in the reservoir.

15. The method of claim 14, including controlling intermittent pumping by the liquid pump using an anaeroid switch which measures the water head above the switch and pumps when the water head reaches a predetermined height, and the anaeroid switch including an atmospheric pressure sensing line against which pressure head is compared, and including placing an outer end of the pressure sensing line adjacent to the atmospheric input to the vacuum pump to adjust the atmospheric pressure sensed by the anaeroid switch, to thereby effect adjustment of the level of the liquid in the reservoir.

16. The method of claim 1, including directing the spray from the nozzles into a sleeve where the atomized spray is commingled with a flow of air constantly drawn through the sleeve by a vacuum pump, creating said subatmospheric pressure, and including creating high shear in the sleeve with a multi-stage turbine driven at about 1600 to 3500 RPM, the multi-stage turbine also supplementing the vacuum pump to increase flow rate of liquid and gases through the sleeve.

17. The method of claim 16, wherein the multi-stage turbine includes turbine blades about 7½ inches in diameter, and wherein the inside diameter of the sleeve is about 8 inches.

18. A system for removing hydrocarbon components from an aqueous waste stream, comprising:

a pump for receiving an aqueous waste stream and ejecting the waste stream at elevated pressure, an electrolysis unit downstream of the liquid pump, positioned to receive the aqueous waste stream under pressure and to electrolyze the water in the stream and thereby supersaturate the water with oxygen, a contact tank downstream of the electrolysis unit, with adequate capacity to receive and hold the pressurized, oxygen supersaturated waste stream for a preselected duration of contact time, thus promoting oxidation and reduction of contaminants in the waste stream, nozzle means downstream of the contact tank for sharply reducing pressure on the aqueous stream by spraying the stream to atomize the liquid, means for subjecting the depressurized liquid stream to subatmospheric pressure, thereby to promote outgassing of volatiles and semivolatiles from the aqueous waste stream, and a liquid reservoir and means for collecting liquids from the waste stream in the reservoir and for separately withdrawing gases from the stream, including oxygen and outgassed hydrocarbon components.

19. The system of claim 18, including a housing in the bottom of which is said liquid reservoir, and including a sleeve in the housing, open to exterior atmosphere at its top and within the liquid of the reservoir at its bottom, the sleeve containing a multi-stage turbine driven by a motor, positioned downstream of the nozzles to create high shear in the depressurized and atomized stream.

20. The system of claim 19, wherein the sleeve includes diversion baffles between turbine blades, positioned to return liquids toward the center of the sleeve before encountering a succeeding turbine blade.

* * * * *